United States Patent
Zhang et al.

(10) Patent No.: US 9,220,138 B1
(45) Date of Patent: Dec. 22, 2015

(54) SOFT BLEEDER TO REMOVE STEP DIMMING

(71) Applicant: Marvell International Ltd., Hamilton (BM)

(72) Inventors: Wanfeng Zhang, Palo Alto, CA (US); Hao Peng, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/560,742

(22) Filed: Dec. 4, 2014

Related U.S. Application Data

(60) Provisional application No. 61/913,674, filed on Dec. 9, 2013, provisional application No. 61/943,276, filed on Feb. 21, 2014.

(51) Int. Cl.
*H05B 37/02* (2006.01)
*H05B 33/08* (2006.01)
*H02M 3/335* (2006.01)

(52) U.S. Cl.
CPC ....... *H05B 33/0815* (2013.01); *H02M 3/33507* (2013.01); *H05B 33/0845* (2013.01)

(58) Field of Classification Search
CPC .............................. H05B 33/0815; H05B 37/02
USPC .................................................. 315/201, 219
See application file for complete search history.

(56) References Cited

U.S. PATENT DOCUMENTS

| | | | |
|---|---|---|---|
| 2012/0319610 A1* | 12/2012 | Yoshinaga | 315/210 |
| 2013/0113375 A1* | 5/2013 | Leung et al. | 315/85 |
| 2013/0229121 A1* | 9/2013 | Otake et al. | 315/200 R |
| 2014/0159616 A1* | 6/2014 | Wang et al. | 315/307 |
| 2014/0225532 A1* | 8/2014 | Groeneveld | 315/307 |
| 2015/0103568 A1* | 4/2015 | Del Carmen, Jr. | 363/21.16 |

* cited by examiner

*Primary Examiner* — Don Le

(57) ABSTRACT

Power lighting control methods and systems for solid state lighting are disclosed. For example, a power control system includes a transformer that includes a primary coil configured to receive a first voltage based on an output of a switching circuit, a secondary coil configured to generate a first current based on the first voltage to power a solid-state load, and a bleeder coil coupled to a bleeder switch, and a control module that causes the bleeder switch to turn on incrementally during a dimming event over M power cycles, where M is a positive integer, so as to eliminate or reduce a current step in the first current provided to the solid state load.

19 Claims, 6 Drawing Sheets

SOFT BLEEDER TO REMOVE STEP DIMMING

INCORPORATION BY REFERENCE

This application claims the benefit of U.S. Provisional Application Ser. No. 61/913,674, filed on Dec. 5, 2013 and U.S. Provisional Application Ser. No. 61/943,276, filed on Feb. 21, 2014, the content of both are incorporated herein by reference in their entirety.

BACKGROUND

A solid-state lamp, e.g., a lamp that uses a number light emitting diodes (LEDs), can provide the same level of luminous intensity as an incandescent lamp while consuming less power. As an example, an LED may consume 6 watts of power for a given luminous intensity, whereas an incandescent light may consume 60 watts of power for the same luminous intensity. The luminous intensity per power usage rating (e.g., luminance/watt rating) of solid-state lamps continues to increase with technology improvements in solid-state lamps. As a result, solid-state lamps can provide a high level of luminous intensity while using a relatively low level of power.

SUMMARY

Various aspects and embodiments of the invention are described in further detail below.

In an embodiment, a power control system includes a transformer that includes a primary coil configured to receive a first voltage based on an output of a switching circuit, a secondary coil configured to generate a first current based on the first voltage to power a solid-state load, and a bleeder coil coupled to a bleeder switch, and a control module that causes the bleeder switch to turn on incrementally during a dimming event over M power cycles, where M is a positive integer, so as to eliminate or reduce a current step in the first current provided to the solid state load.

In another embodiment, a power control system includes a transformer that includes a primary coil configured to receive a first voltage based on an output of a switching circuit, a secondary coil configured to generate a first current based on the first voltage to power a solid-state load that includes a plurality of light emitting diodes (LEDS) placed in series, and a bleeder coil coupled to a bleeder switch, wherein the transformer is part of a DC-to-DC power converter that reduces the first voltage to a second voltage lower than the first voltage: a diode and a resistor placed in series with the bleeder switch and the bleeder coil; a control module that causes the bleeder switch to turn on incrementally during a dimming event over M power cycles, where M is a positive integer, so as to eliminate or reduce a current step in the first current provided to the solid state load; one or more TRIACs that receive an alternating current power signal: and a rectifier electrically that receives power from the one or more TRIACs so as to produce the first voltage; wherein the bleeder switch is configured to cause a reliable turn on of the one or more TRIACs, the control module is further configured to DC-to-DC power converter; and the control module is configured to: determine whether a dimming level is less than a predetermined threshold: and change the state of the bleeder switch to an ON state when the dimming level is less than the predetermined threshold.

In yet another embodiment, a power control method includes receiving a first voltage based on an output of a switching circuit using a transformer that includes a primary coil configured to receive the first voltage; generating first current based on the first voltage via a secondary coil of the transformer to power a solid-state load: and controlling bleeder switch coupled to a bleeder coil of the transformer to turn on incrementally during a dimming event over M power cycles, where M is a positive integer, so as to eliminate or reduce a current step in the first current provided to the solid state load.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

This disclosure presents a mechanism called "soft bleeder compensation," which is used to remove step dimming noticeable in solid state lighting when TRIAC dimmers dim down at a fast rate. That is, when TRIAC-based dimmers are used to control solid state lighting, e.g., LEDs, and dimming occurs relatively fast, there is a noticeable step in the dimming of the lighting. The methods and systems below describe an approach to remove such an effect.

Figure 1:
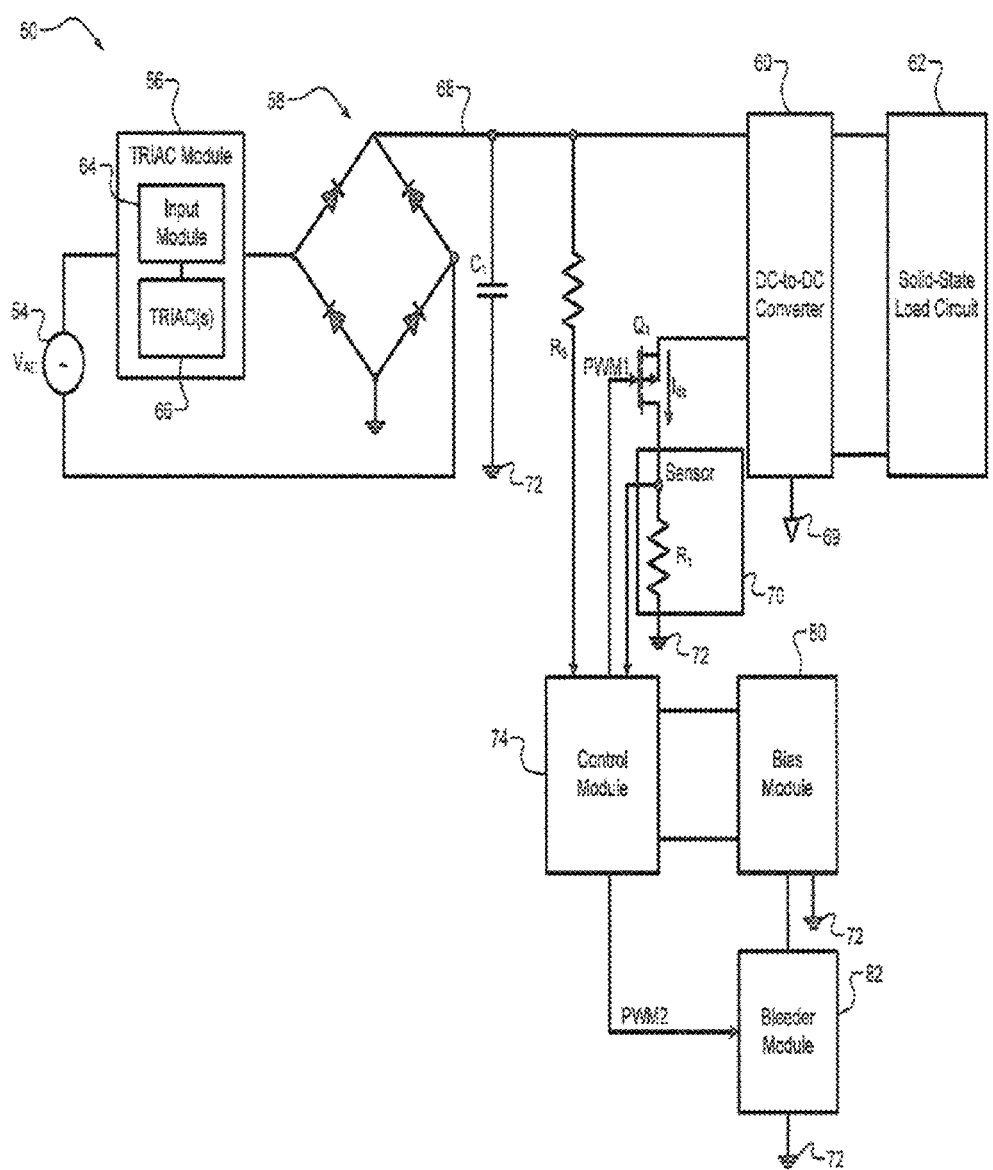
FIG. 1 is an example TRIAC-based dimmer circuit.

FIG. 1 is an example TRIAC-based dimmer circuit 50. As shown in FIG. 1, the TRIAC dimming system 50 includes an AC power source 54, a TRIAC module 56 (also referred to as a TRIAC dimmer), a rectifying bridge 58, a DC-to-DC converter 60, a Solid State Lighting (SSL) circuit 62, a control module 74, a bias module 80 and a bleeder module 82. The TRIAC module 56 includes an input module 64 and one or more TRIAC(s) 66. The TRIAC(s) 66 can be configured for incandescent light and/or solid-state light operation and have corresponding latch-up and holding current levels. Control to the input module 64 may be provided, for example, by a variable resistor or other suitable component(s) to adjust the turn ON time of the TRIAC(s) and, as a result, a dimming level of the SSL circuit 62.

The TRIAC dimming system 50 further include a first capacitor $C_1$, a first switch $Q_1$, and a sensor 70. The first capacitor $C_1$ is connected between the DC voltage bus 68 and a second ground reference 72, and aids in maintaining the first DC voltage on the DC voltage bus 68. The second ground reference 72 is optionally different than a first ground reference 69. The second ground reference 72 may be isolated from, and have a different voltage potential than, the first ground reference 69.

The first switch $Q_1$ and the sensor 70 are connected in series between the DC-to-DC converter 60 and the second ground reference 72. The first switch $Q_1$ and the sensor 70 are connected on a primary (high-voltage) side of the DC-to-DC converter 60. The first switch $Q_1$ is a metal-oxide-semiconductor field-effect transistor (MOSFET) controlled by a control module 74. However, in other embodiments the first switch $Q_1$ may take the form of a bipolar or any other type of transistor or controllable switch.

In operation, the bridge 58 rectifies an AC output voltage received from the TRIAC module 56 to provide a first DC voltage on a DC voltage bus 68. The DC-to-DC converter 60 is connected to the first ground reference 69 and converts the first DC voltage to a second (usually lower) DC voltage, which is provided to the SSL circuit 62. The DC-to-DC converter 60 may be in a flyback, boost, buck, buck-boost, or other suitable configuration. The SSL circuit 62 includes, for example, one or more solid-state lamps, such as light emitting diodes (LEDs).

The sensor 70 is used to detect current through the first switch $Q_1$, which may be converted to a current level of the SSL circuit 62 via the control module 74. The sensor 70 includes, for example, a first resistor $R_1$ or other suitable components for detecting voltage and/or current at a drain of the first switch $Q_1$.

The control module 74 generates a first control signal PWM1 to control operation of the first switch $Q_1$ based on the first DC voltage, the voltage $V_{R1}$ across the first resistor $R_1$, the current $I_{ds}$ passing through the first resistor $R_1$, and/or the current $I_L$ passing through the SSL circuit 62.

The first control signal PWM1 is provided to a control terminal (e.g., a gate terminal) of the first switch $Q_1$ so as to control a level and/or a duty cycle of current received by the primary winding 104. This in turn will control the power received by the SSL circuit 62. The control module 74 is connected to the DC voltage bus 68 to detect the first DC voltage via a third resistor $R_3$.

The control module 74 may also be connected to a node between the first switch $Q_1$ and the first resistor $R_1$ to detect the voltage $V_{R1}$ across the first resistor $R_1$ and/or the current $I_{ds}$ passing through the first resistor $R_1$. The control module 74 may determine the current $I_L$ based on the first DC voltage, the voltage $V_{R1}$ and/or the current $I_{ds}$. The control module 74 may be programmable to provide different luminance, bleed current, and dimming level relationships. Further functionality of the control module 74 will be provided below.

The bias module 80 operates as a power supply for the control module 74.

The bleeder module 82 diverts current from the bias module 80 to the second ground reference 72 based on a second control signal PWM2 received from the control module 74.

The control module 74 generates the second control signal PWM2 based on the voltage $V_{R1}$, the current $I_{ds}$, and/or the current $I_L$ passing through the SSL circuit 62, and according to a soft bleeding procedure that will be explained in detail below.

Figure 2:
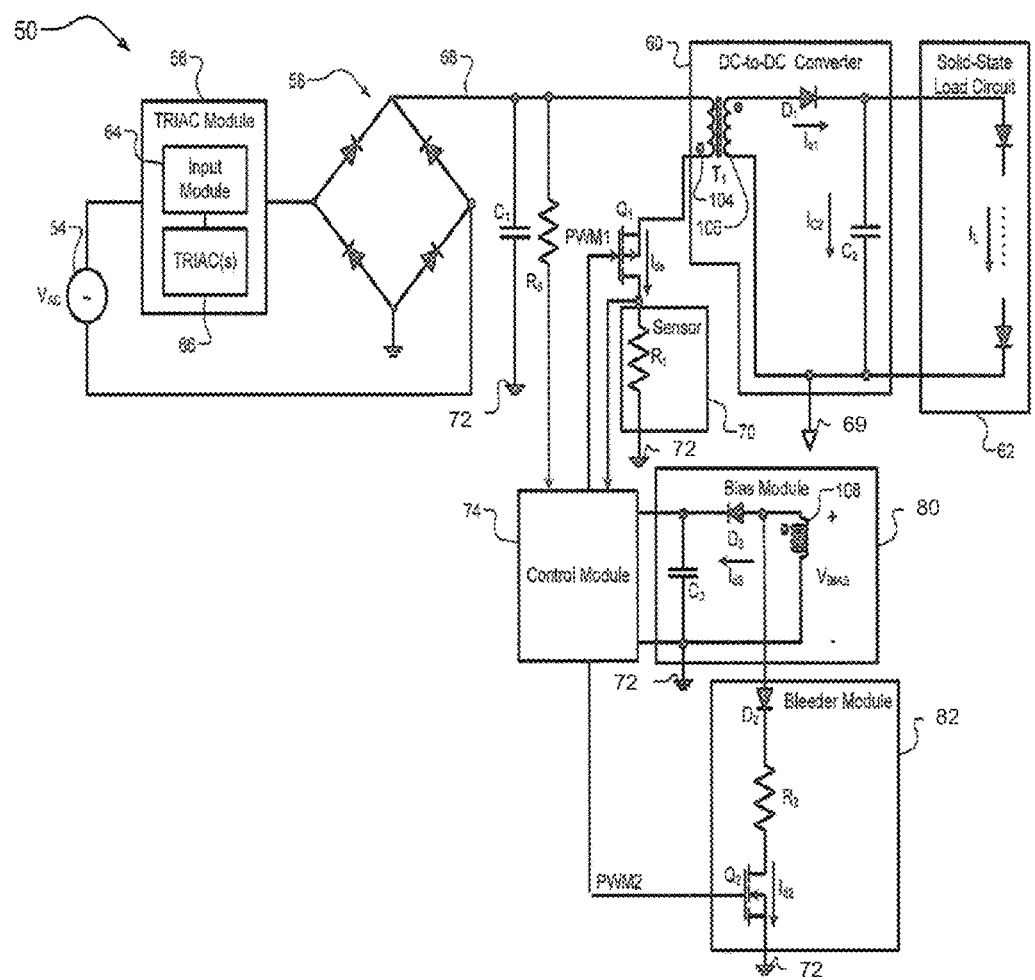
FIG. 2 depicts greater detail of the TRIAC-based dimmer circuit of FIG. 1.

FIG. 2 depicts the TRIAC dimming system 50 of FIG. 1 in greater detail. For example, the DC-to-DC converter 60 is shown to include a transformer $T_1$, first diode $D_1$, and a second capacitor $C_2$. The transformer $T_1$ includes a primary coil 104 on a primary side and a secondary coil 106 on a secondary side. The transformer $T_1$ also includes a bleeder coil 108 (shown in the bias module 80), which also receives power from the primary coil 104. Although the example DC-to-DC converter 60 is shown in a flyback configuration, the DC-to-DC converter 60 may be in a boost, buck, buck-boost or any other known or later developed suitable converter configuration.

The secondary coil 106, the first diode $D_1$ and the second capacitor $C_2$ operate as a power supply for the SSL circuit 62. The first diode $D_1$, the second capacitor $C_2$, and the SSL circuit 62 are connected on the secondary (or low-voltage) side of the transformer $T_1$. The first diode $D_1$ is connected in series with the secondary coil 106 and prevents reverse current through the secondary coil 106. Current through the first diode $D_1$ is designated $I_{d1}$.

The second capacitor $C_2$ is connected between an output (cathode) of the first diode $D_1$ and a first ground reference 69 and is connected across the SSL circuit 62. The second capacitor $C_2$ is connected in parallel with the secondary coil 106 and aids in maintaining a second DC voltage across the SSL circuit 62. Current through the second capacitor C2 is designated $I_{C2}$. The example SSL circuit 62 includes LEDs connected in series between terminals of the second capacitor $C_2$. Load current through the SSL circuit 62 is designated $I_L$.

The bleeder module 82 diverts current (using the bleeder coil 108) from the second coil 106 to the second ground reference 72. In the implementation as shown, the bias module 80 and the bleeder module 82 share the bleeder coil 108.

The bleeder module 82 includes a second diode $D_2$, a second resistor (or bleeder resistor) $R_2$, and a second switch $Q_2$. The second diode $D_2$, the second resistor (or bleeder resistor) $R_2$, and the second switch $Q_2$ are connected in series between (i) the third diode $D_3$ and the bleeder coil 108, and (ii) the second ground reference 72. The second diode $D_2$ prevents reverse current through the bleeder coil 108. The bleeder resistor $R_2$ is used to bleed current from the transformer $T_1$ via the bleeder coil 108 to the second ground reference 72. The bleeder resistor R2 is optional and can be external to the control module 74 and/or an integrated within the control module 74. The second switch $Q_2$ is used to control the bleed current through the second resistor $R_2$ based on the second control signal PWM2. While the example second switch $Q_2$ is a MOSFET, as with the first switch $Q_2$, the form of second switch $Q_2$ may change to any number of different types of transistors/switches.

Since the second switch $Q_2$ receives current from the bias module 80 and shares the same ground reference 72 as the control module 74, the switch $Q_2$ can optionally be incorporated in the control module 74. The switch $Q_2$ is controlled based on the current supplied to the SSL circuit 62, which is based on a dimming level of the TRIAC module 56. The dimming level of the TRIAC module 56 is determined based on the first DC voltage of the DC voltage bus 68. The second switch $Q_2$ may be turned ON during deep dimming conditions, such as when a conduction angle of the TRIAC module 56 is low (less than a predetermined angle). A deep dimming condition may refer to a condition when a dimming level is less than a predetermined dimming level and/or when a luminous intensity output of the SSL circuit 62 is less than a predetermined luminous intensity output level.

In order to effectively bleed power so as to draw sufficient holding current from the TRIAC module 56, the bleed current Id through the second diode $D_2$ and the second resistor $R_2$ should be sufficiently high, which will vary according to the specifications of a particular TRIAC.

The second switch $Q_2$ and/or the second resistor $R_2$ may be included in the control module 74 and/or an integrated circuit of the control module 74. Similarly, the second resistor $R_2$ may be external and separate from the control module 74 and/or an integrated circuit of the control module 74 to allow thermal energy in the second resistor $R_2$ to be dissipated externally and away from the control module 74.

The bleeder module 82, by virtue of the bleeder coil 108, has an effect of draining energy from transformer $T_1$ that would otherwise be used to power the SSL circuit 62.

When the first switch $Q_1$ is turned on, the primary inductance in parallel with the primary winding 104 is charged up, the energy is stored in the primary side as $½Li^2$, where L is the inductance of the primary coil 104 and i denotes the current running through it.

When the first switch $Q_1$ is turned off, stored energy will transfer from the primary side to the secondary side via the secondary coil 106, and to the bleeder module 80 via the bleeder coil 108. Energy fed to the secondary coil 106 is used to power the SSL circuit 62 while energy fed to the bleeder coil is mostly consumed through the bleeder resistor $R_2$ and second/bleeder switch $Q_2$.

If the second/bleeder switch $Q_2$ is turned off, the stored energy will transfer from the primary coil to the SSL/secondary side because there is no loading at the bias coil side. However, if the second switch $Q_2$ is turned on, the majority of the energy will transfer to the bias/bleeder coil side, thus implemented the power bleeding functionality, i.e., bleeding power away from the SSL circuit 62.

Figure 3:
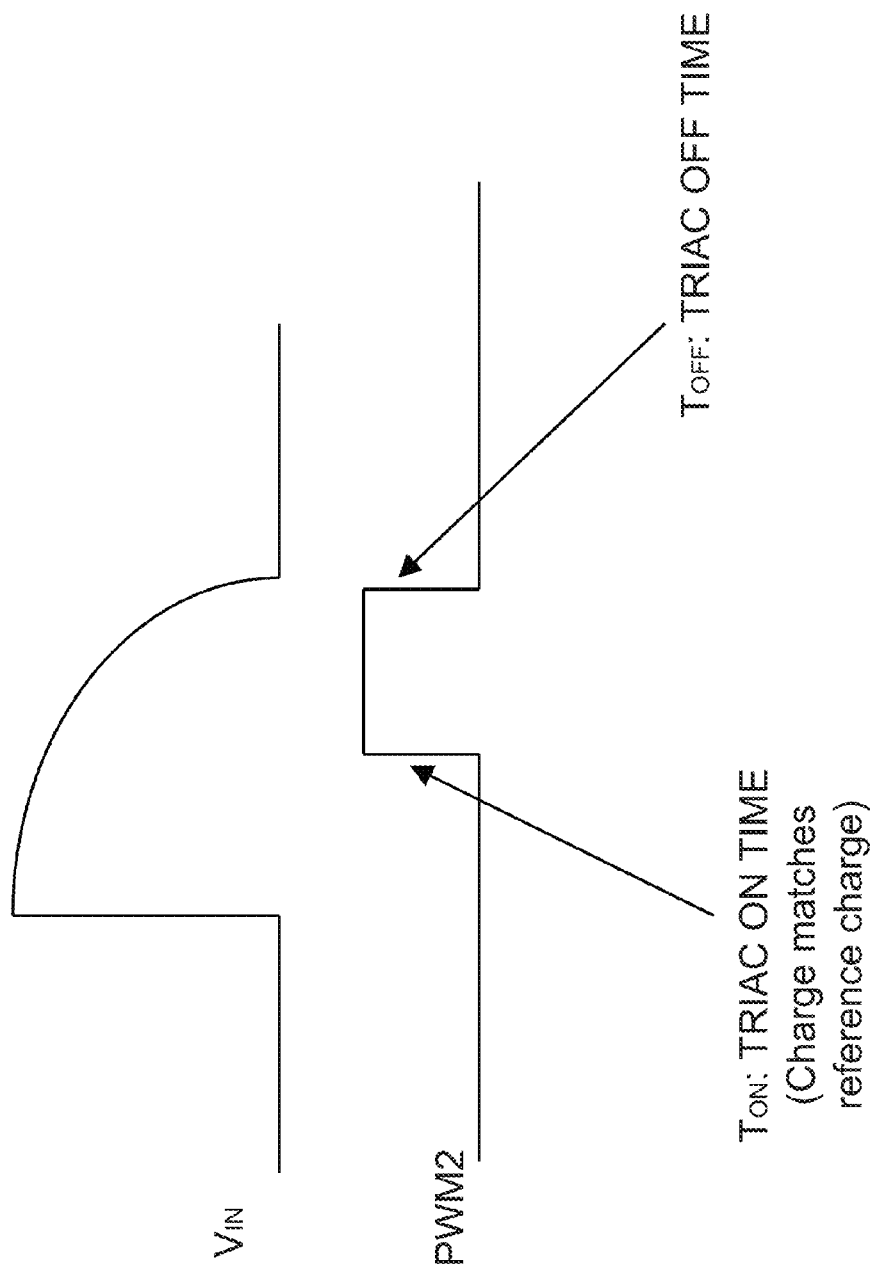
FIG. 3 depicts the turn on and turn off times relative to a TRIAC on period.

In order to provide "soft bleeding," a charge pump like bleeder behavior is used as is depicted in FIG. 3 and described below.

The delivered charge $C_{delivered}$ to the primary coil 104 that occurs during a $V_{IN}$ half line cycle (as a function of TRIAC off duration $T_{off}$) can be described as:

$$C_{delivered} = \sum_n I_{peak} \times T_{off}, \quad \text{Eq.(1)}$$

while a reference charge $C_{ref}$ can be described as:

$$C_{ref} = I_{ref} \times T_{half\_line}. \quad \text{Eq. (2)}$$

The reference current $I_{ref}$ is determined by the dimming curve and the conduction angle, and the half-line period is sampled every half-line cycle. Accordingly, the reference charge $C_{ref}$ can be quantified as a predetermined number at the beginning of each half line cycle.

At the same time, the actually delivered charge is accumulated by the product of the peak current and the off time of each switching cycle. Whenever the accumulated delivered charge matches the reference charge, the bleeder module 82 (via the second switch $Q_2$) will be turned on to dissipate power on the auxiliary winding instead of the LED load side. Thus, the bleeder will turn on whenever the actual delivered charge matches the reference charge ($T_{ON}$), and turn off at the end of TRIAC turn on ($T_{OFF}$).

The above-described behavior helps solving certain shimmering issue due to line voltage imbalance when TRIACs are used. However, when a TRIAC dims down from a wide conduction angle (i.e., the TRIAC is on a relatively long time) to a low conduction angle (i.e., the TRIAC is on a relatively short time), several things happen.

First, the conduction angle signal has to pass through a low pass filter to get the conduction angle so as to calculate the reference current. This results in a delay.

Second, the control module 74 may include either a single integrator type compensator or a proportion plus integrator type compensator to control a time period, which introduces another loop delay to the driver response. After the delay of the low pass filter and loop delay of the time period control compensation, the reference current becomes very low, and the switching frequency during the TRIAC on time has become the minimum frequency, the bleeder switch $Q_1$ will turn on immediately (or after a short interval) after the TRIAC turns on.

The dimming process has three steps.

The first step is the TRIAC dimming down. This occurs when the conduction angle become small and is unavoidable.

The second step is long delayed time period due to low pass filter delay and compensator loop delay discussed above.

The third step is when the control module 74 turns on the second switch $Q_2$/bleeder module 82.

Figure 4:
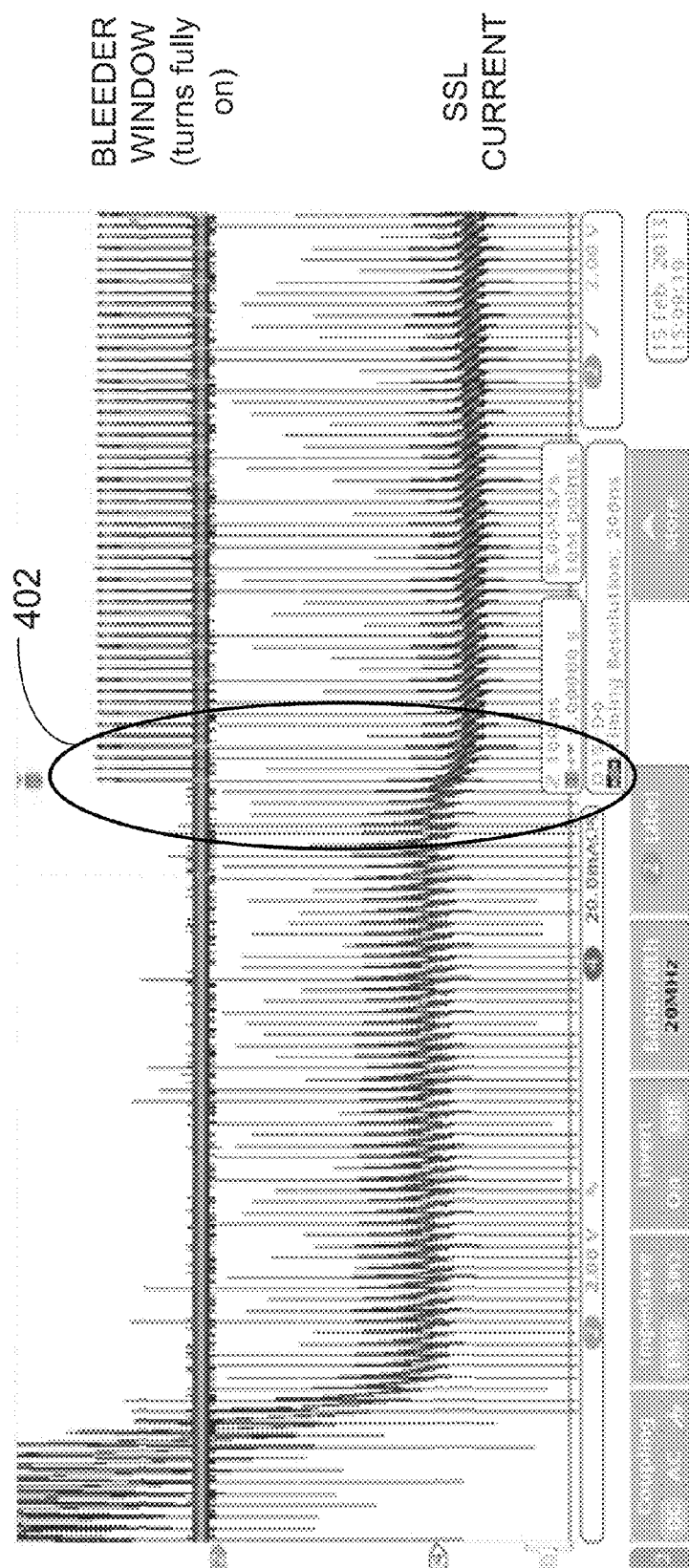
FIG. 4 depicts a current consumption of a solid state lighting circuit without soft bleeder compensation.

The first step is anticipated. The second step is not anticipated and causes an undesired visual step dimming experience. This phenomenon is suggested in FIG. 4 where, at time window 402, SSL current drops quickly.

To avoid step dimming, the soft bleeder idea works with the charge pump concept by judiciously/incrementally turning on the bleeder module 82 over a plurality of multiple half line power cycles until the bleeder window is completely utilized.

The soft bleeder process is implemented by the control module 74. The start of this process is determined by measuring current in the past N half line cycles there is no bleeding occurs, where N is a positive integer. Thirty cycles is a viable example of N.

During a dimming down event, the control module 74 gradually engages the bleeding process. Typically, the bleeding process is engaged in M increments where M is a positive integer, such as 32 or 64. For the first half line cycle in the dimming transition process, the control module 74 turns on the second switch $Q_2$ for one switching cycle (1 of M) for one half line cycle. For the second/next half line cycle, the control module 74 turns on the second switch $Q_2$ for two switching cycles (or 2 switching cycles every 32/64 switching cycles). This process goes on and on until the control module 74 turns on the second switch $Q_2$ completely or to a predetermined maximum. This way the bleeder module 82 is turned on gradually during a dimming down process, but will still turn on immediately in a normal half line cycle.

Figure 5:
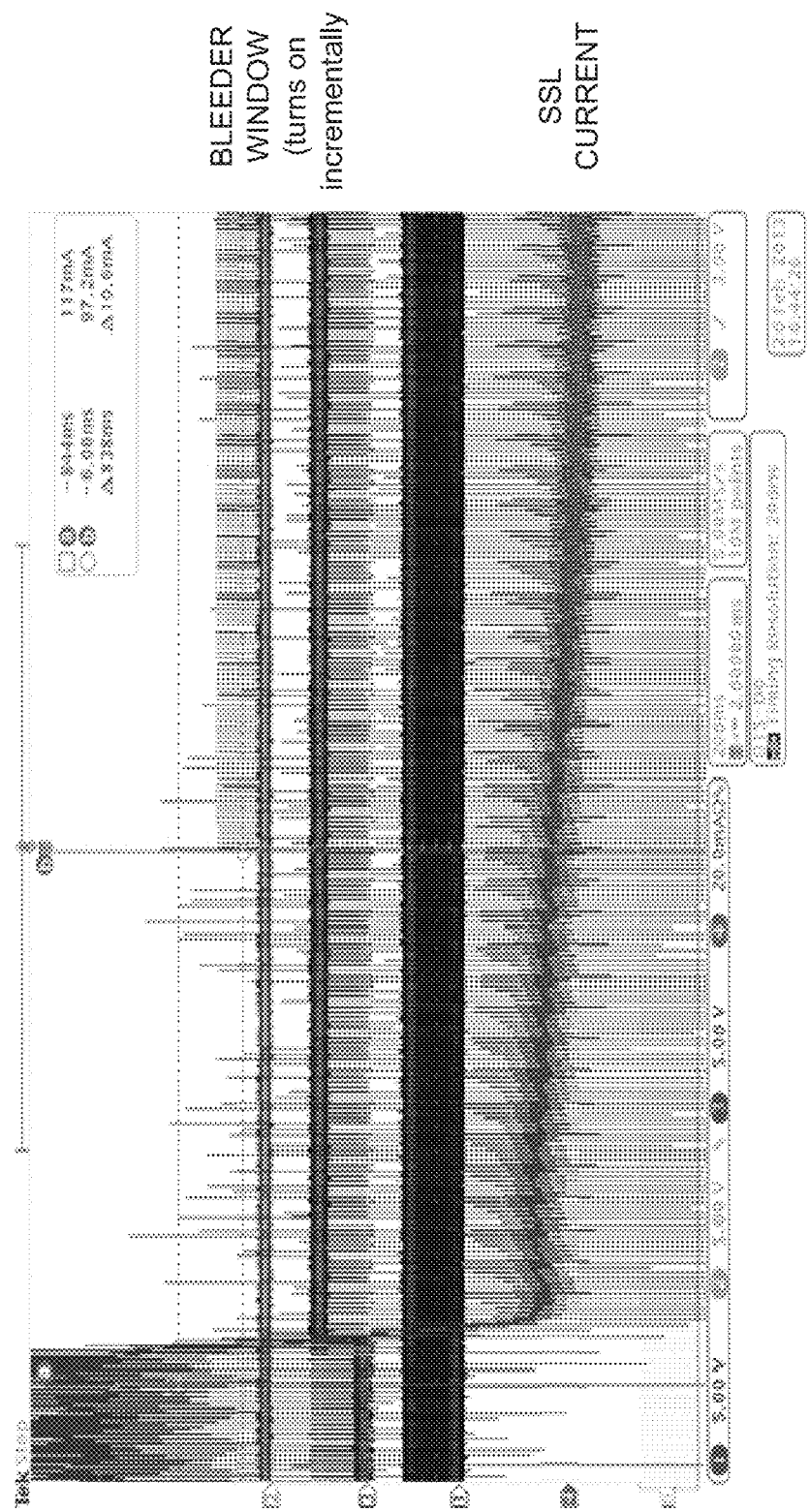
FIG. 5 depicts a current consumption of a solid state lighting circuit with soft bleeder compensation.

FIG. 5 shows the effect after soft bleeding is implemented. In FIG. 5, it can be seen that, during the dimming down process, only the first step is observed, which is the result of the TRIAC conduction angle becoming small. This is a mechanical change and is expected. However, the second step (402 from FIG. 4), which is a result of the bleeder module turning on abruptly, has disappeared because of the soft bleeder approach.

Figure 6:
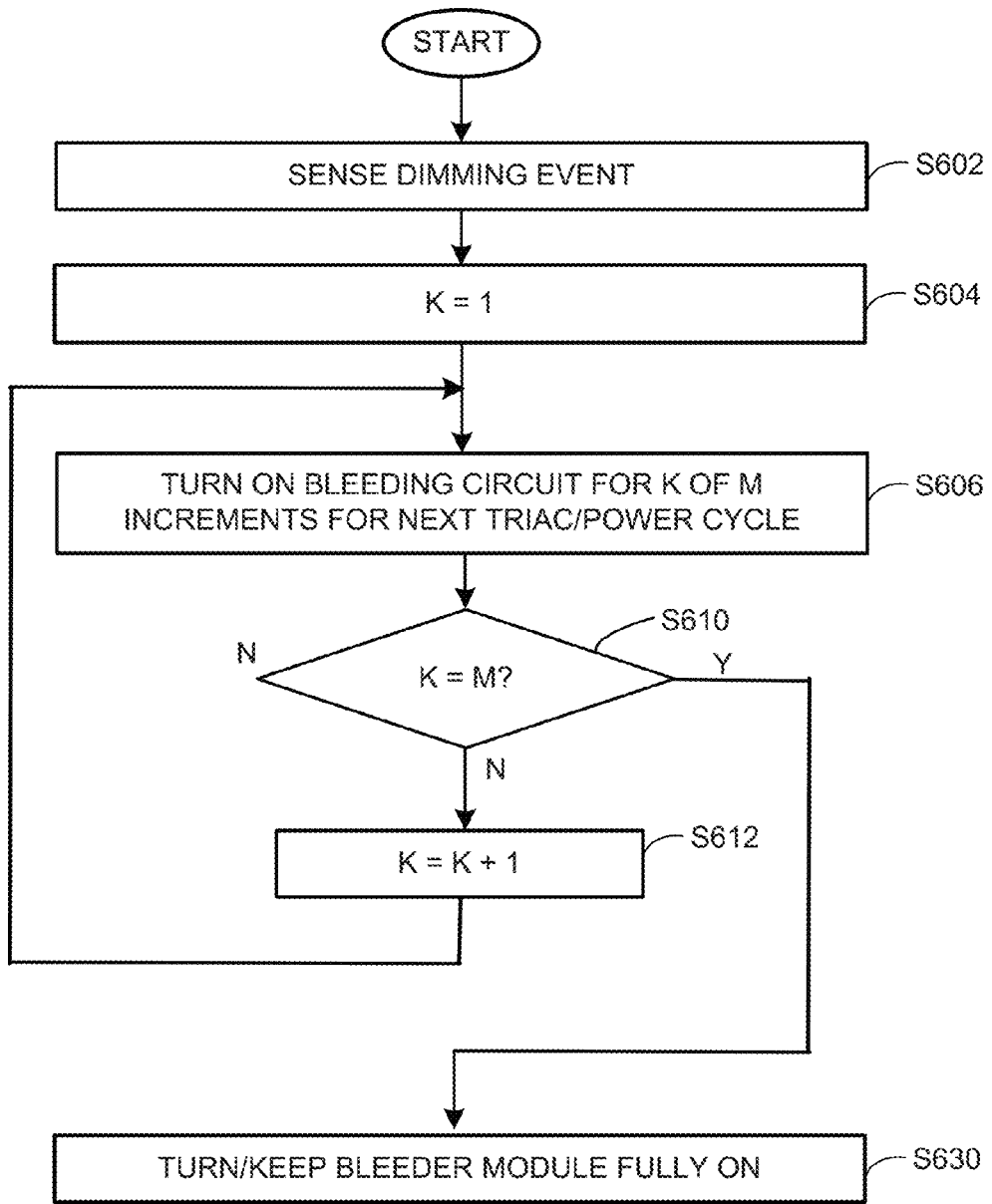
FIG. 6 is a flowchart outlining an operation for soft bleeder compensation.

FIG. 6 is a flowchart outlining an operation for soft bleeder compensation. As shown in FIG. 6, the process starts at S602 where a dimming event is sensed by, for example, comparing a reference charge to a charge developed as a result of the dimming process. At S604 a variable K is set to 1. At S606 for a first TRIAC/power cycle (e.g., 50 or 60 Hz power cycle) a bleeding circuit, such as the bleeder module 82 of FIGS. 1-2, is turned on for a period of K of M increments where M is a positive integer, conveniently a number divisible by 2.

At S610 a determination is made as to whether K=M. If K=M, then control jumps to S630: otherwise, control continues to S612.

At S612, K is incremented, and control jumps back to S606 where the bleeding circuit is turned on for an incrementally larger time period.

At S630, (K=M) the bleeding circuitry is turned fully on and remains so until, for example, more power is provided by the TRIAC(s) so as to increase lighting.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A power control system, comprising:
   a transformer that includes a primary coil configured to receive a first voltage based on an output of a switching circuit, a secondary coil configured to generate a first current based on the first voltage to power a solid-state load, and a bleeder coil coupled to a bleeder switch; and
   a control module that causes the bleeder switch to turn on a variable amount of time during a dimming event over M power cycles, where M is a positive integer, so as to eliminate or reduce a current step in the first current provided to the solid state load.

2. The system of claim 1, wherein the solid state load includes a plurality of light emitting diodes (LEDS) placed in series.

3. The system of claim 2, wherein the transformer is part of a DC-to-DC power converter that reduces the first voltage to a second voltage lower than the first voltage.

4. The system of claim 1, wherein the transformer is part of a DC-to-DC power converter that reduces the first voltage to a second voltage lower than the first voltage.

5. The system of claim 4, further comprising:
   one or more TRIACs that receive an alternating current power signal; and
   a rectifier electrically that receives power from the one or more TRIACs so as to produce the first voltage.

6. The system of claim 5, wherein the bleeder switch is configured to cause the one or more TRIACs to turn on.

7. The system of claim 6, further comprising a diode and a resistor placed in series with the bleeder switch and the bleeder coil.

8. The system of claim 4, wherein the control module is further coupled to a DC-to-DC power converter.

9. The system of claim 1, wherein the control module is configured to: determine whether a dimming level is less than a predetermined threshold; and change the state of the bleeder switch to an ON state when the dimming level is less than the predetermined threshold.

10. A power control system, comprising:
    a transformer that includes a primary coil configured to receive a first voltage based on an output of a switching circuit, a secondary coil configured to generate a first current based on the first voltage to power a solid-state load that includes a plurality of light emitting diodes (LEDS) placed in series, and a bleeder coil coupled to a bleeder switch, wherein the transformer is part of a DC-to-DC power converter that reduces the first voltage to a second voltage lower than the first voltage;
    a diode and a resistor placed in series with the bleeder switch and the bleeder coil;
    a control module that causes the bleeder switch to turn on incrementally during a dimming event over M power cycles, where M is a positive integer, so as to eliminate or reduce a current step in the first current provided to the solid state load;
    one or more TRIACs that receive an alternating current power signal; and
    a rectifier electrically that receives power from the one or more TRIACs so as to produce the first voltage; wherein the bleeder switch is configured to cause a reliable turn on of the one or more TRIACs,
    the control module is further coupled to a DC-to-DC power converter, and
    the control module is configured to: determine whether a dimming level is less than a predetermined threshold; and change the state of the bleeder switch to a fully ON state when the dimming level is less than the predetermined threshold.

11. A power control method, comprising:
    receiving a first voltage based on an output of a switching circuit using a transformer that includes a primary coil configured to receive the first voltage;
    generating first current based on the first voltage via a secondary coil of the transformer to power a solid-state load; and
    controlling bleeder switch coupled to a bleeder coil of the transformer to turn on a variable amount of time during a dimming event over M power cycles, where M is a positive integer, so as to eliminate or reduce a current step in the first current provided to the solid state load.

12. The method of claim 11, wherein the solid state load includes a plurality of light emitting diodes (LEDS) placed in series.

13. The method of claim 12, wherein the transformer is part of a DC-to-DC power converter that reduces the first voltage to a second voltage lower than the first voltage.

14. The method of claim 11, wherein the transformer is part of a DC-to-DC power converter that reduces the first voltage to a second voltage lower than the first voltage.

15. The method of claim 4, further comprising:
    receiving an alternating current power signal by one or more TRIACs; and
    rectifying power received from the one or more TRIACs so as to produce the first voltage.

16. The method of claim 15, wherein the bleeder switch is further configured to cause a reliable turn on of the one or more TRIACs.

17. The method of claim 16, wherein a diode and a resistor are placed in series with the bleeder switch and the bleeder coil.

18. The method of claim 14, further comprising controlling the DC-to-DC power converter using a control module.

19. The method of claim 18, further comprising:
    determining whether a dimming level is less than a predetermined threshold; and changing the state of the bleeder switch to a fully ON state when the dimming level is less than the predetermined threshold.

* * * * *